US012437913B2

(12) United States Patent
Wang et al.

(10) Patent No.: US 12,437,913 B2
(45) Date of Patent: Oct. 7, 2025

(54) COIL INDUCTOR AND METHOD FOR FORMING THE SAME

(71) Applicant: INMICRO MAGNETIC INTEGRITY TECHNOLOGY CO., LTD., Xiamen (CN)

(72) Inventors: Mingliang Wang, Fujian (CN); Xuesong Liu, Fujian (CN)

(73) Assignee: INMICRO MAGNETIC INTEGRITY TECHNOLOGY CO., LTD., Xiamen (CN)

(*) Notice: Subject to any disclaimer, the term of this patent is extended or adjusted under 35 U.S.C. 154(b) by 819 days.

(21) Appl. No.: 17/720,585

(22) Filed: Apr. 14, 2022

(65) Prior Publication Data

US 2023/0307174 A1 Sep. 28, 2023

Related U.S. Application Data

(63) Continuation of application No. PCT/CN2022/083312, filed on Mar. 28, 2022.

(51) Int. Cl.
*H01F 27/32* (2006.01)
*H01F 27/28* (2006.01)

(52) U.S. Cl.
CPC ......... *H01F 27/32* (2013.01); *H01F 27/2828* (2013.01)

(58) Field of Classification Search
CPC ............................. H01F 27/32; H01F 27/2828
See application file for complete search history.

(56) References Cited

U.S. PATENT DOCUMENTS

2012/0068707 A1* 3/2012 Begg ......................... H02P 3/06 324/318
2012/0286917 A1* 11/2012 Uchida ................. H01F 41/041 336/200

(Continued)

FOREIGN PATENT DOCUMENTS

CN 110880410 A * 3/2002
CN 102411133 A 4/2012

(Continued)

OTHER PUBLICATIONS

International Search Report and Written Opinion in related PCT Application No. PCT/CN2022/083312 dated Dec. 19, 2022 (8 pages).

*Primary Examiner* — Malcolm Barnes
(74) *Attorney, Agent, or Firm* — Bayes PLLC

(57) ABSTRACT

A coil inductor includes a first conductive coil, a second conductive coil, a third conductive coil, a first insulation film, and a second insulation film. The first insulation film is disposed on the first conductive coil, and the first insulation film includes at least one first through hole. The second conductive coil is disposed on the first insulation film. The second insulation film is disposed on the second conductive coil, and the second insulation film includes at least one second through hole unaligned with the first through hole. The third conductive coil is disposed on the second insulation film. The first conductive coil is in electric contact with the second conductive coil through a first contact disposed in the first through hole, and the second conductive coil is in electric contact with the third conductive coil through a second contact disposed in the second through hole.

19 Claims, 18 Drawing Sheets

100

(56) References Cited

U.S. PATENT DOCUMENTS

| | | | | |
|---|---|---|---|---|
| 2013/0335186 | A1* | 12/2013 | Chang | H01F 5/003 336/200 |
| 2016/0141102 | A1* | 5/2016 | Tseng | H01F 27/292 336/200 |
| 2018/0019052 | A1* | 1/2018 | Hashimoto | H01F 41/046 |
| 2018/0323005 | A1* | 11/2018 | Sato | H01F 17/0013 |
| 2019/0082542 | A1* | 3/2019 | Yosui | H05K 3/462 |
| 2019/0318867 | A1* | 10/2019 | Lee | H01F 5/06 |
| 2019/0355508 | A1* | 11/2019 | Lim | H01F 17/0013 |
| 2020/0111608 | A1* | 4/2020 | Sato | H01F 41/046 |

FOREIGN PATENT DOCUMENTS

| | | | |
|---|---|---|---|
| CN | 103377795 | A | 10/2013 |
| CN | 105609267 | A | 5/2016 |
| CN | 108806954 | A | 11/2018 |
| CN | 108878117 | A | 11/2018 |
| WO | 2017038797 | A1 | 3/2017 |

* cited by examiner

100

100

100

200

200

200

COIL INDUCTOR AND METHOD FOR FORMING THE SAME

CROSS REFERENCE TO RELATED APPLICATION

This application is a continuation of International Application No. PCT/CN2022/083312, filed on Mar. 28, 2022, entitled "COIL INDUCTOR AND METHOD FOR FORMING THE SAME," which is hereby incorporated by reference in its entirety.

BACKGROUND

The present disclosure relates to coil inductors and methods for forming coil inductors.

The coil inductors are generally used for electrical applications, which can be categorized into radio frequency (RF) inductors used for signal processing, and power inductors for power supply lines. In the application of RF inductors, the coil inductors may be used for choking, blocking, attenuating, or filtering/smoothing high frequency noise in electrical circuits. In the application of power inductors, the power inductors form part of the voltage conversion circuit in a DC-DC converter or other device. For example, a power inductor is used in a step-up, step-down, or step-up/step-down circuit to convert a certain voltage to the required voltage.

SUMMARY

In one aspect, a coil inductor is disclosed. The coil inductor includes a first conductive coil, a second conductive coil, a third conductive coil, a first insulation film, and a second insulation film. The first insulation film is disposed on the first conductive coil, and the first insulation film includes at least one first through hole. The second conductive coil is disposed on the first insulation film. The second insulation film is disposed on the second conductive coil, and the second insulation film includes at least one second through hole unaligned with the first through hole. The third conductive coil is disposed on the second insulation film. The first conductive coil is in electric contact with the second conductive coil through a first contact disposed in the first through hole, and the second conductive coil is in electric contact with the third conductive coil through a second contact disposed in the second through hole. A first thickness of the first conductive coil, the second conductive coil, and the third conductive coil is between 20 micrometers and 100 micrometers. A second thickness of the first insulation film and the second insulation film is between 5 micrometers and 50 micrometers.

In another aspect, a coil inductor is disclosed. The coil inductor includes a first conductive coil, a first insulation film disposed on the first conductive coil, and a second conductive coil disposed on the first insulation film. The first conductive coil includes a plurality of first conductive films stacking along a first direction. The first insulation film extends along a second direction perpendicular to the first direction and includes at least one through hole. The second conductive coil includes a plurality of second conductive films stacking along the first direction. The first conductive coil is in electric contact with the second conductive coil through a first contact disposed in the through hole.

In still another aspect, a coil inductor is disclosed. The coil inductor includes a first conductive film disposed above a first insulation film, a second conductive film disposed beneath the first insulation film, a third conductive film disposed above a second insulation film, and a fourth conductive film disposed beneath the second insulation film. The first conductive film and the second conductive film are in electric contact through a first contact formed in the first insulation film. The third conductive film and the fourth conductive film are in electric contact through a second contact formed in the second insulation film. The second conductive film is attached to the third conductive film.

In yet another aspect, a power converting system is disclosed. The power converting system includes a coil inductor configured to convert a source voltage to a required voltage, and a controller coupled to the coil inductor. The coil inductor includes a first conductive coil, a second conductive coil, a third conductive coil, a first insulation film, and a second insulation film. The first insulation film is disposed on the first conductive coil, and the first insulation film includes at least one first through hole. The second conductive coil is disposed on the first insulation film. The second insulation film is disposed on the second conductive coil, and the second insulation film includes at least one second through hole unaligned with the first through hole. The third conductive coil is disposed on the second insulation film. The first conductive coil is in electric contact with the second conductive coil through a first contact disposed in the first through hole, and the second conductive coil is in electric contact with the third conductive coil through a second contact disposed in the second through hole. A first thickness of the first conductive coil, the second conductive coil, and the third conductive coil is between 20 micrometers and 100 micrometers. A second thickness of the first insulation film and the second insulation film is between 5 micrometers and 50 micrometers. The controller is coupled to the coil inductor and is configured to control operations of the coil inductor.

In yet another aspect, a power converting system is disclosed. The power converting system includes a coil inductor configured to convert a source voltage to a required voltage, and a controller coupled to the coil inductor. The coil inductor includes a first conductive coil, a first insulation film disposed on the first conductive coil, and a second conductive coil disposed on the first insulation film. The first conductive coil includes a plurality of first conductive films stacking along a first direction. The first insulation film extends along a second direction perpendicular to the first direction and includes at least one through hole. The second conductive coil includes a plurality of second conductive films stacking along the first direction. The first conductive coil is in electric contact with the second conductive coil through a first contact disposed in the through hole.

In yet another aspect, a power converting system is disclosed. The power converting system includes a coil inductor configured to convert a source voltage to a required voltage, and a controller coupled to the coil inductor. The coil inductor includes a first conductive film disposed above a first insulation film, a second conductive film disposed beneath the first insulation film, a third conductive film disposed above a second insulation film, and a fourth conductive film disposed beneath the second insulation film. The first conductive film and the second conductive film are in electric contact through a first contact formed in the first insulation film. The third conductive film and the fourth conductive film are in electric contact through a second contact formed in the second insulation film. The second conductive film is attached to the third conductive film.

In yet another aspect, a manufacturing method for forming a coil inductor is disclosed. A plurality of first conductive films are stacked to form a first conductive coil. A plurality of second conductive films are stacked to form a second conductive coil. The first conductive coil, a first insulation film, and the second conductive coil are stacked together. The first conductive coil is in electric contact with the second conductive coil through a first contact formed in the first insulation film.

BRIEF DESCRIPTION OF THE DRAWINGS

The accompanying drawings, which are incorporated herein and form a part of the specification, illustrate aspects of the present disclosure and, together with the description, further serve to explain the present disclosure and to enable a person skilled in the pertinent art to make and use the present disclosure.

Figure 1:
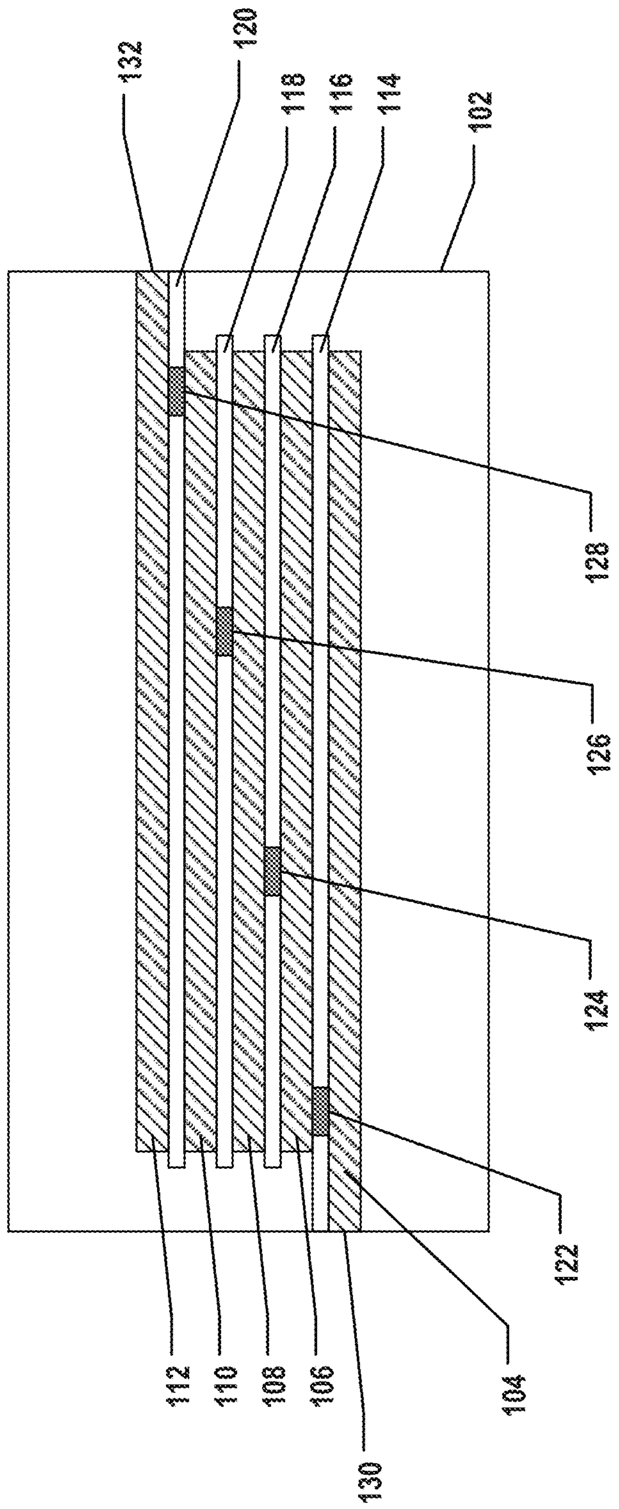
FIG. 1 illustrates a cross-section of an exemplary coil inductor, according to some aspects of the present disclosure.

The present disclosure will be described with reference to the accompanying drawings.

DETAILED DESCRIPTION

Although specific configurations and arrangements are discussed, it should be understood that this is done for illustrative purposes only. As such, other configurations and arrangements can be used without departing from the scope of the present disclosure. Also, the present disclosure can also be employed in a variety of other applications. Functional and structural features as described in the present disclosures can be combined, adjusted, and modified with one another and in ways not specifically depicted in the drawings, such that these combinations, adjustments, and modifications are within the scope of the present discloses.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a" "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

It should be readily understood that the meaning of "on," "above," and "over" in the present disclosure should be interpreted in the broadest manner such that "on" not only means "directly on" something but also includes the meaning of "on" something with an intermediate feature or a layer therebetween, and that "above" or "over" not only means the meaning of "above" or "over" something but can also include the meaning it is "above" or "over" something with no intermediate feature or layer therebetween (i.e., directly on something).

Further, spatially relative terms, such as "beneath," "below," "lower," "above," "upper," and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations), and the spatially relative descriptors used herein may likewise be interpreted accordingly.

As used herein, the term "layer" refers to a material portion including a region with a thickness. A layer can extend over the entirety of an underlying or overlying structure or may have an extent less than the extent of an underlying or overlying structure. Further, a layer can be a region of a homogeneous or inhomogeneous continuous structure that has a thickness less than the thickness of the continuous structure. For example, a layer can be located between any pair of horizontal planes between, or at, a top surface and a bottom surface of the continuous structure. A layer can extend horizontally, vertically, and/or along a tapered surface. A substrate can be a layer, can include one or more layers therein, and/or can have one or more layer thereupon, thereabove, and/or therebelow. A layer can include multiple layers. For example, an interconnect layer can include one or more conductor and contact layers (in which interconnect lines and/or via contacts are formed) and one or more dielectric layers.

As used herein, the term "coil" refers to a structure consisting of something wound in a continuous series of loops. The shape of the coil may be circle, square, rectangle, oval, triangle or any polygon. The coil may be wound or moved in a spiral course. In some implementations, the coil is a generic name for an electrode in the shape of a spiral. In some implementations, an inductor may be also called a coil. The inductor is a passive two-terminal electrical component that stores energy in a magnetic field when electric current flows through it. An inductor typically consists of an insulated wire wound into a coil.

The inductance of a circuit depends on the geometry of the current path as well as the magnetic permeability of nearby materials. The inductor may consist of a wire or other conductor shaped to increase the magnetic flux through the circuit, usually in the shape of a coil or helix, with two terminals. Winding the wire into a coil increases the number of times the magnetic flux lines link the circuit, increasing the field and thus the inductance. The more turns, the higher the inductance. The inductance also depends on the shape of the coil, separation of the turns, and many other factors. By adding a "magnetic core" made of a ferromagnetic material like iron inside the coil, the magnetizing field from the coil will induce magnetization in the material, increasing the magnetic flux. The high permeability of a ferromagnetic core can increase the inductance of a coil by a factor of several thousand over what it would be without it.

FIG. 1 illustrates a cross-section of an exemplary coil inductor 100, according to some aspects of the present disclosure. FIGS. 2-6 illustrate plan views of different layers of coil inductor 100, according to some aspects of the present disclosure. For the purpose of better describing the present disclosure, the cross-section and the plan view of coil inductor 100 in FIG. 1 and FIGS. 2-6 will be discussed together.

As shown in FIG. 1, coil inductor 100 may include a magnetic body 102, a plurality of conductive coils, and a plurality of insulation films disposed between two adjacent conductive coils. For example, a first conductive coil 104 and a second conductive coil 106 may be separated by a first insulation film 114, second conductive coil 106 and a third conductive coil 108 may be separated by a second insulation film 116, third conductive coil 108 and a fourth conductive coil 110 may be separated by a third insulation film 118, and fourth conductive coil 110 and a fifth conductive coil 112 may be separated by a fourth insulation film 120. It is understood that five layers of conductive coils are shown in FIG. 1 for illustration purpose only, and the inductor structure may have more than five layers or less than five layers of conductive coils according to different requirements.

In some implementations, magnetic body 102 may be formed by a mixture of magnetic alloy powders and binders. In some implementations, the mixture may be powder or paste. In some implementations, the mixture may include a ferrite material containing the respective components of Fe, Ni, Zn and/or Cu as main components. In some implementations, the mixture may include a ferrite material containing Ni—Cu—Zn based ferrite material, Ni—Cu—Zn—Mg based ferrite material, and/or Ni—Cu based ferrite material. In some implementations, the mixture may include a ferrite sintered body.

In some implementations, the plurality of conductive coils and the plurality of insulation films are embedded in the mixture, and the mixture may be baked or cured to solidify to form magnetic body 102. In some implementations, after embedding the plurality of conductive coils and the plurality of insulation films in the mixture, a compression process may be performed onto the mixture to enhance the compactness of the mixture, and then the baking process may be performed to solidify the mixture.

In some implementations, first conductive coil 104, second conductive coil 106, third conductive coil 108, fourth conductive coil 110, and fifth conductive coil 112 may be formed by metal. In some implementations, first conductive coil 104, second conductive coil 106, third conductive coil 108, fourth conductive coil 110, and fifth conductive coil 112 may be formed by copper films or copper foils. In some implementations, the thickness of first conductive coil 104, second conductive coil 106, third conductive coil 108, fourth conductive coil 110, and fifth conductive coil 112 may be in a range between 20 micrometers and 100 micrometers.

In some implementations, first insulation film 114, second insulation film 116, third insulation film 118, and fourth insulation film 120 may be formed by nonconductive material. In some implementations, first insulation film 114, second insulation film 116, third insulation film 118, and fourth insulation film 120 may be formed by polyimide films. In some implementations, the thickness of first insulation film 114, second insulation film 116, third insulation film 118, and fourth insulation film 120 may be in a range between 5 micrometers and 50 micrometers. In some implementations, the thickness of first insulation film 114, second insulation film 116, third insulation film 118, and fourth insulation film 120 may be in a range between 15 micrometers and 30 micrometers.

As shown in FIG. 1 and FIGS. 2-6, each of first insulation film 114, second insulation film 116, third insulation film 118, and fourth insulation film 120 may include at least one through hole. In some implementations, a first contact 122 may be formed in the through hole of first insulation film 114, a second contact 124 may be formed in the through hole of second insulation film 116, a third contact 126 may be formed in the through hole of third insulation film 118, and a fourth contact 128 may be formed in the through hole of fourth insulation film 120. In some implementations, first contact 122 may electrically couple first conductive coil 104 with second conductive coil 106, second contact 124 may electrically couple second conductive coil 106 with third conductive coil 108, third contact 126 may electrically couple third conductive coil 108 with fourth conductive coil 110, and fourth contact 128 may electrically couple fourth conductive coil 110 with fifth conductive coil 112.

In some implementations, first contact 122, second contact 124, third contact 126, and fourth contact 128 may be formed by conductive material. In some implementations, first contact 122, second contact 124, third contact 126, and fourth contact 128 may be formed by copper. In some implementations, in the side view of coil inductor 100, first contact 122, second contact 124, third contact 126, and fourth contact 128 may be unaligned. In other words, in the plan view of coil inductor 100, first contact 122, second contact 124, third contact 126, and fourth contact 128 may be nonoverlapped with each other.

Figure 2:
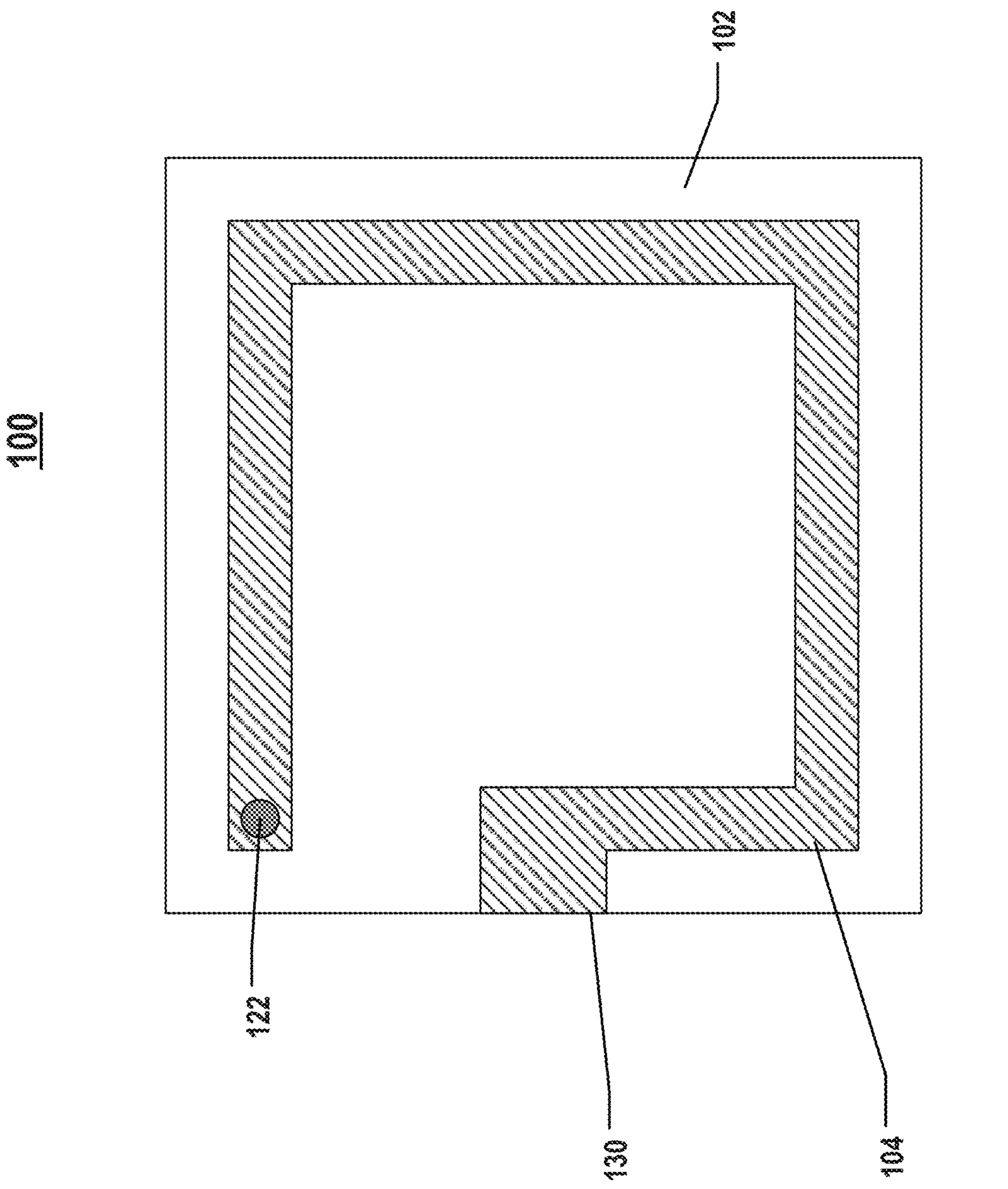
FIGS. 2-6 illustrate plan views of an exemplary coil inductor, according to some aspects of the present disclosure.
Figure 3:
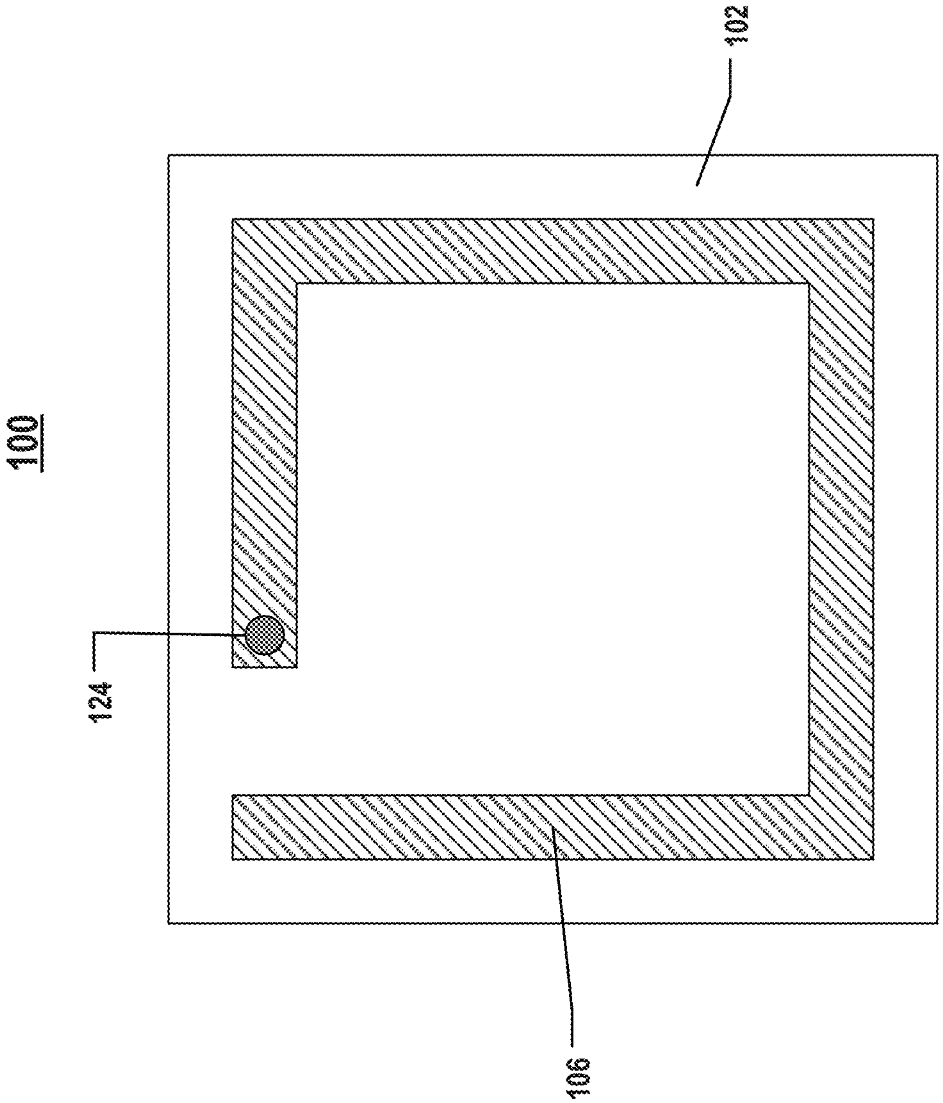
Figure 4:
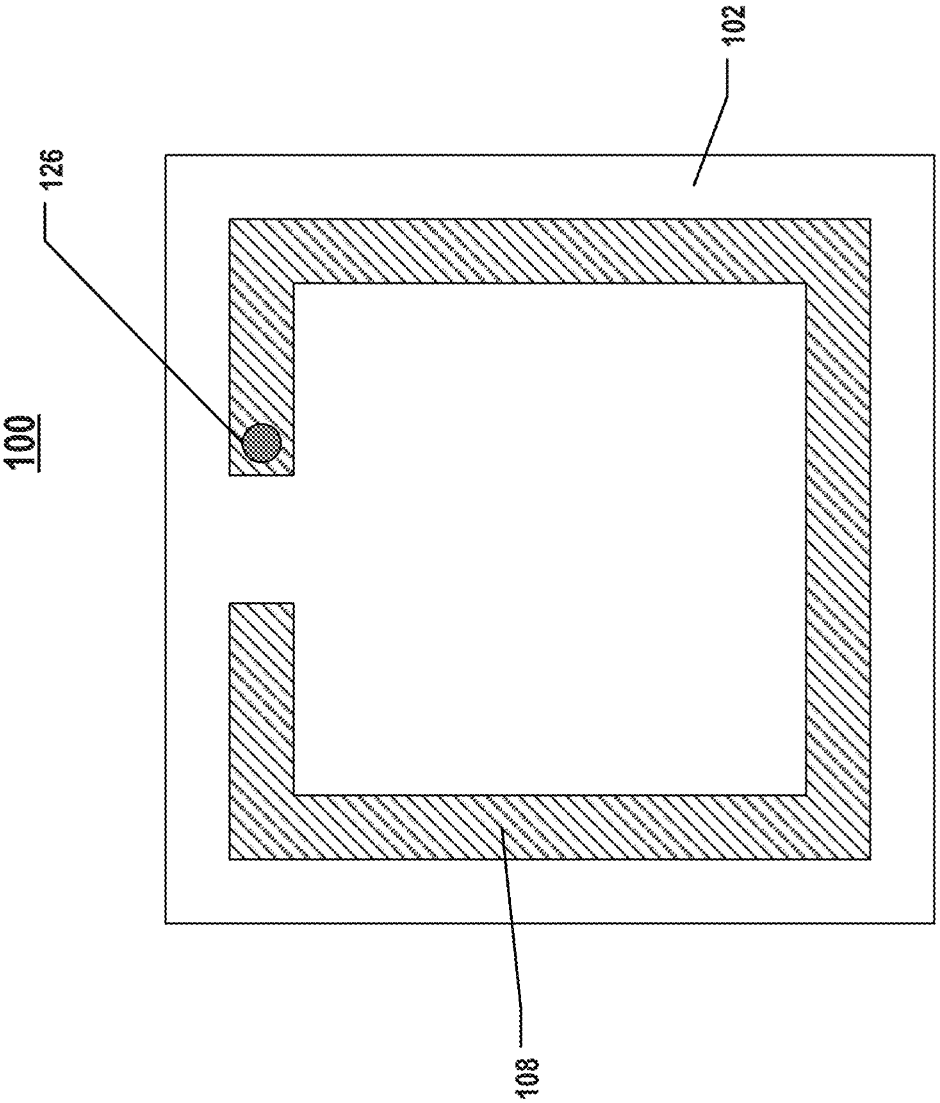
Figure 5:
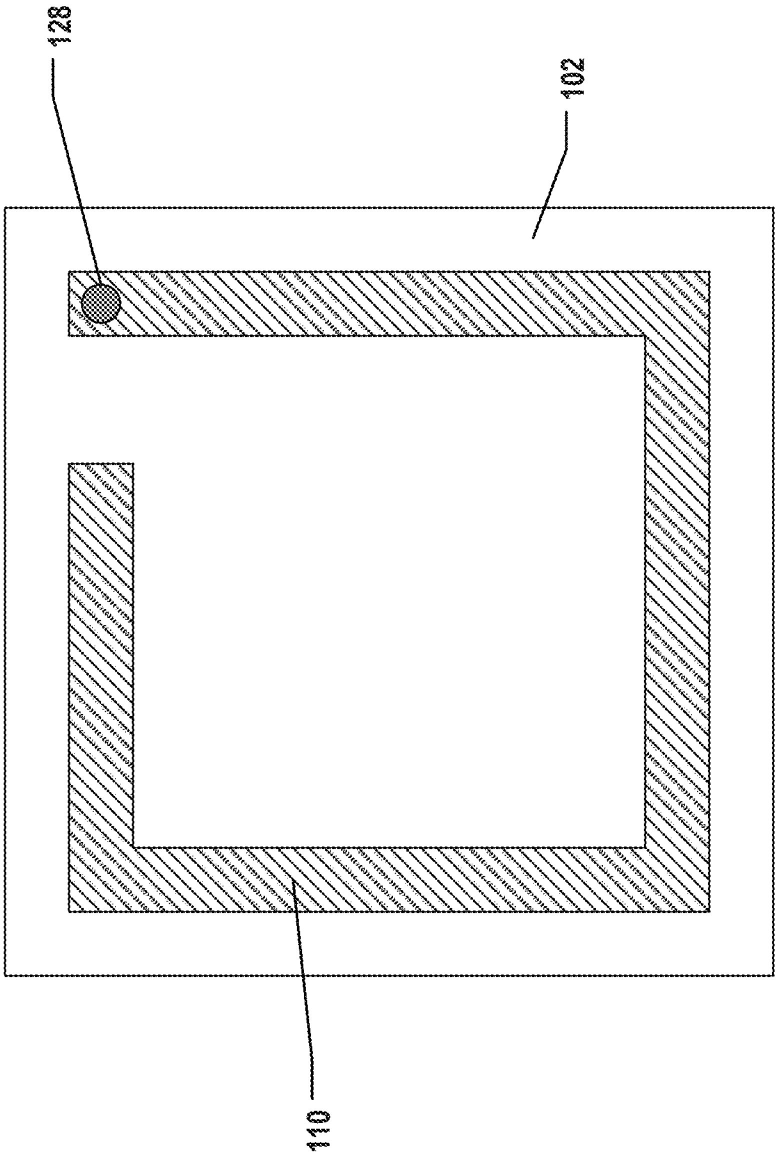
Figure 6:
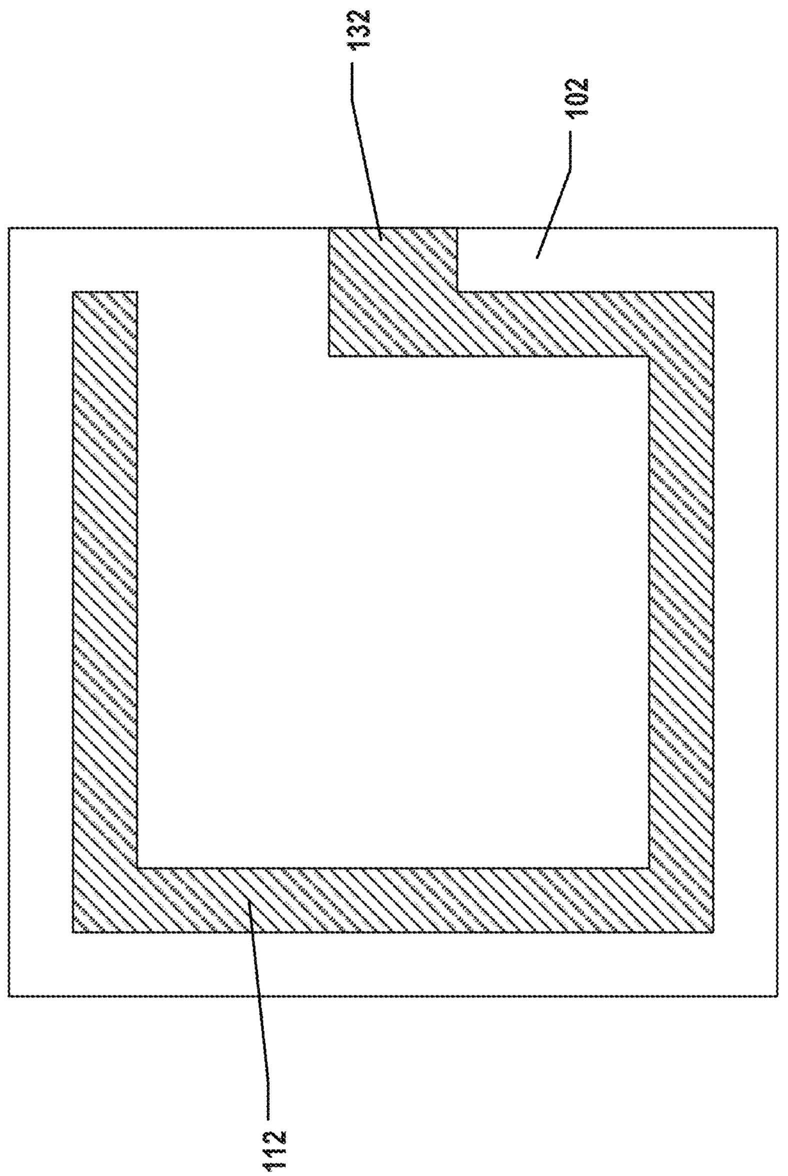

Coil inductor 100 may further include a first end 130 and a second end 132. In some implementations, first end 130 may be disposed on conductive coil 104, and second end 132 may be disposed on fifth conductive coil 112. First end 130 and second end 132 may be electrically coupled to the external terminals. In some implementations, the current path in coil inductor 100 may begin from first end 130, as shown in FIG. 2, and go through first conductive coil 104 and first contact 122 into second conductive coil 106. Then, the current path goes through second conductive coil 106 and second contact 124, as shown in FIG. 3, and goes into third conductive coil 108. The current path goes through third conductive coil 108 and third contact 126, as shown in FIG. 4, and goes into fourth conductive coil 110. The current path goes through fourth conductive coil 110 and fourth contact 128, as shown in FIG. 5, and goes into fifth conductive coil 112. As shown in FIG. 6, the current path goes through fifth conductive coil 112 and outputs at second end 132.

By stacking multiple layers of conductive coils and insulation films, and using lithography operation and electroplating process to form the contacts between adjacent conductive coils, coil inductor 100 may include more than three coil layers. Furthermore, by using the thin conductive coils and thin insulation films to form the coil stacks, the thickness of coil inductor 100 may be further reduced.

Figure 7:
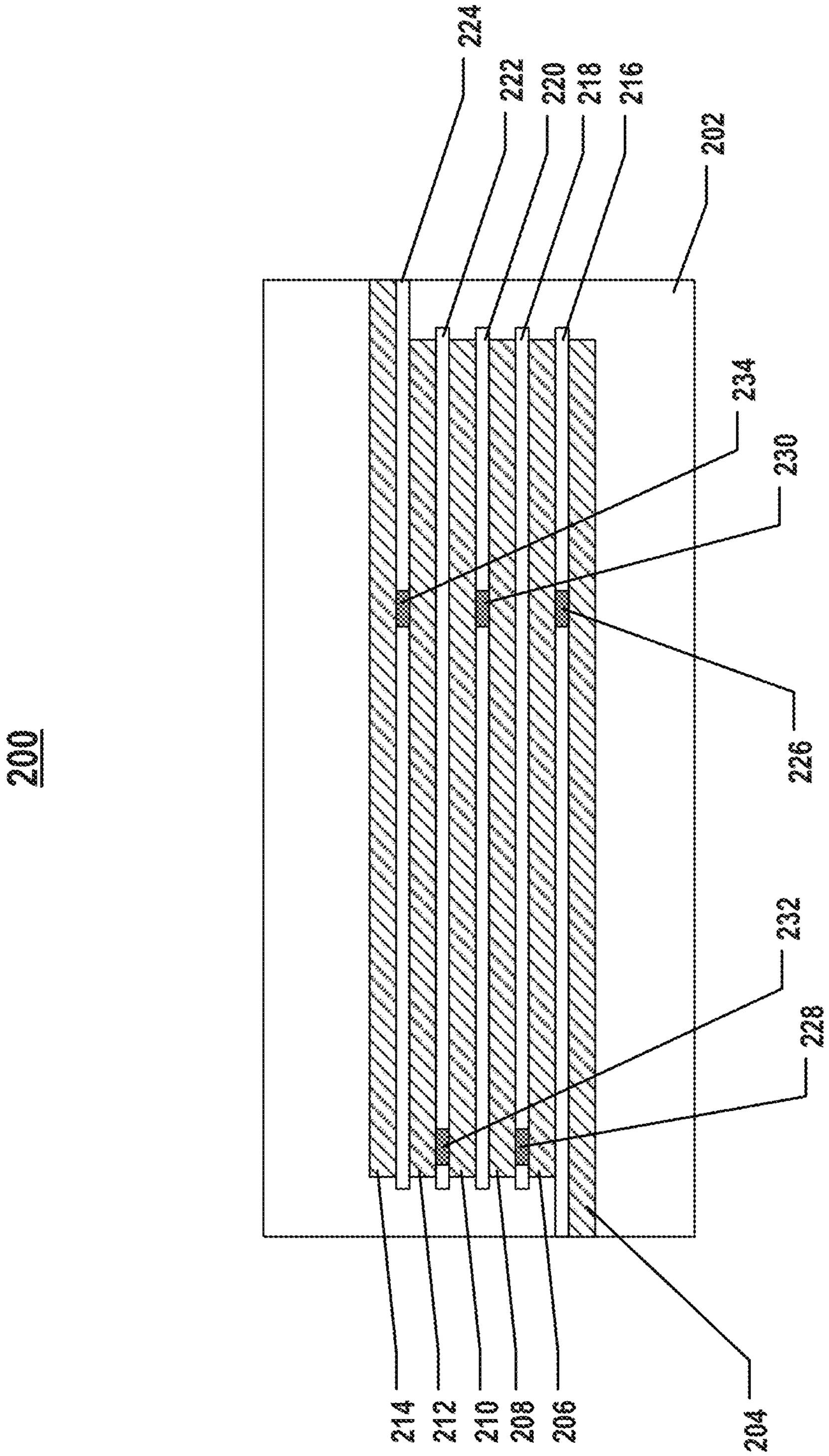
FIG. 7 illustrates a cross-section of an exemplary coil inductor, according to some aspects of the present disclosure.
Figure 8:
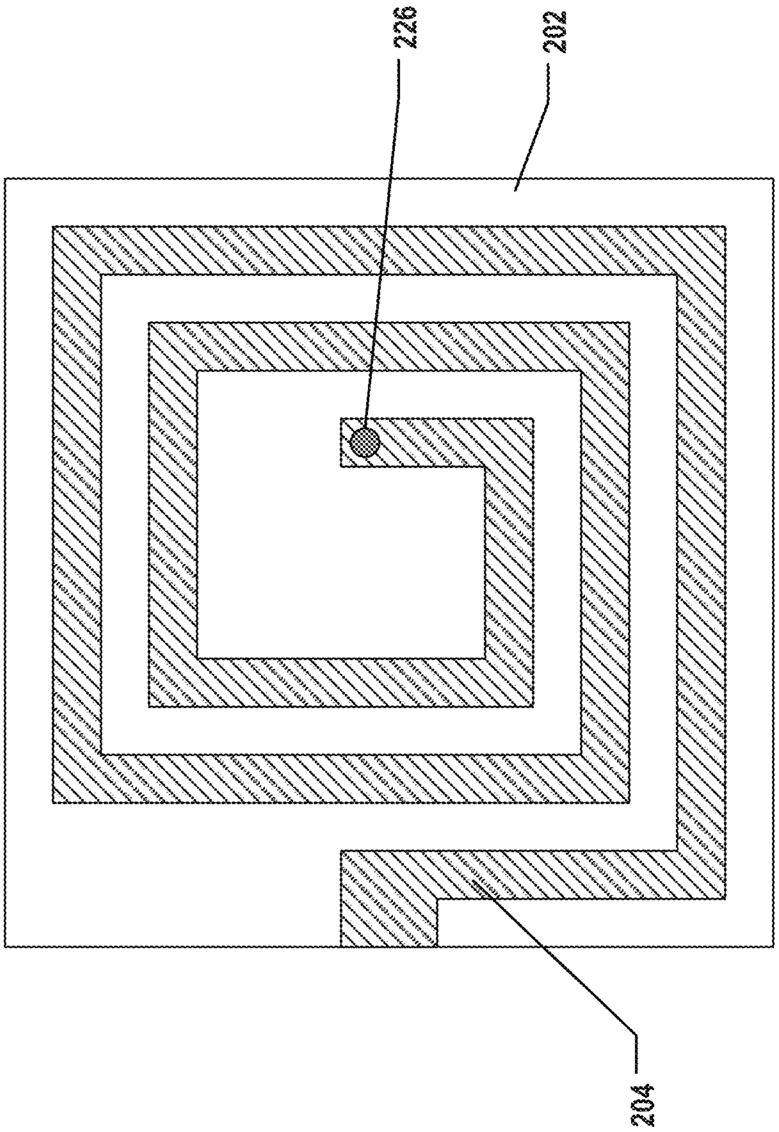
FIGS. 8-13 illustrate plan views of an exemplary coil inductor, according to some aspects of the present disclosure.
Figure 9:
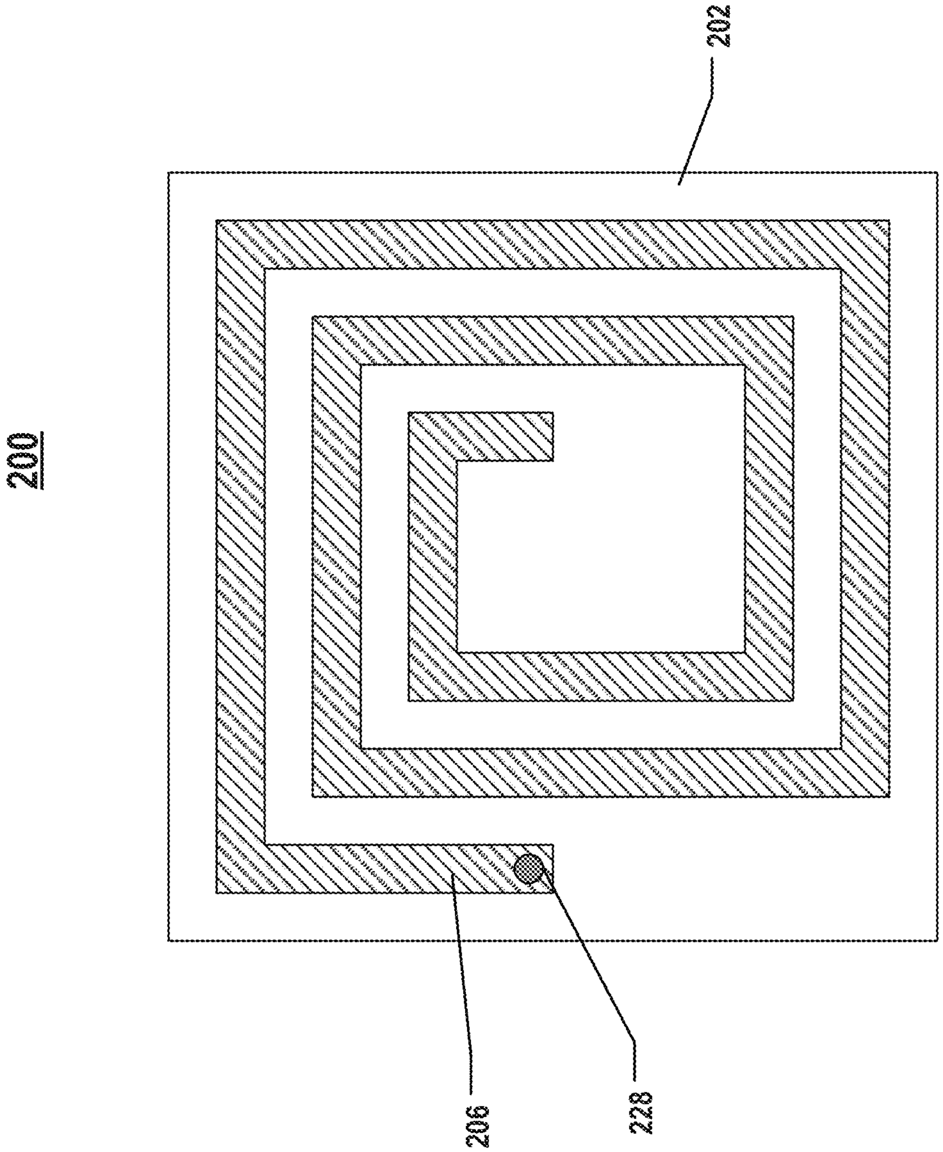
Figure 10:
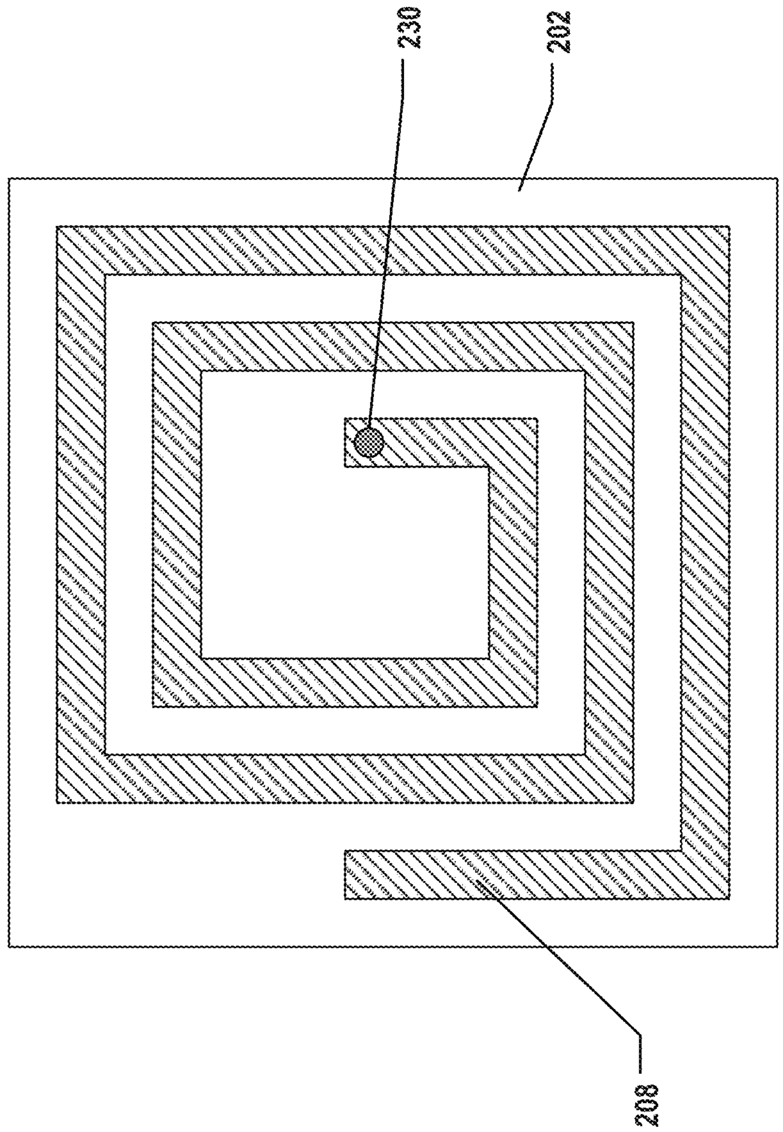
Figure 11:
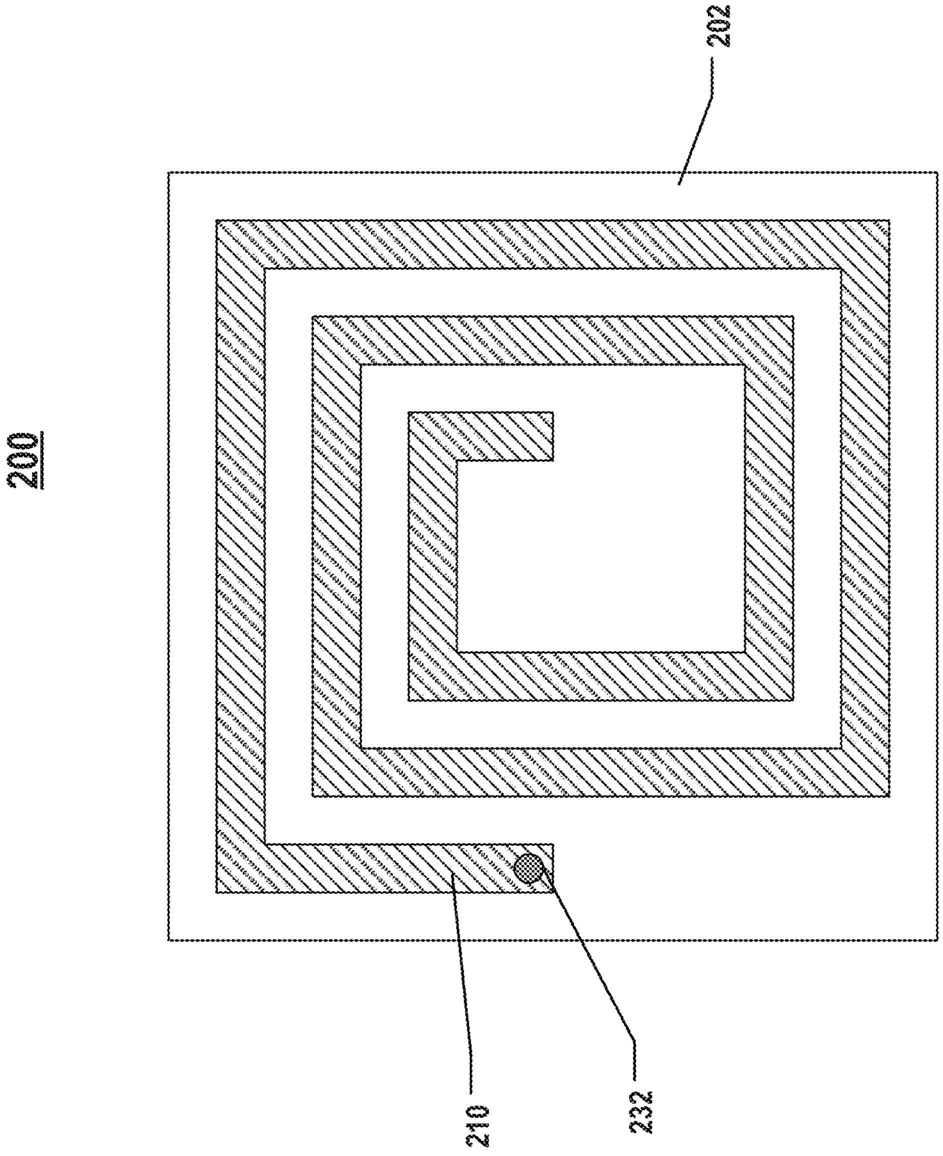
Figure 12:
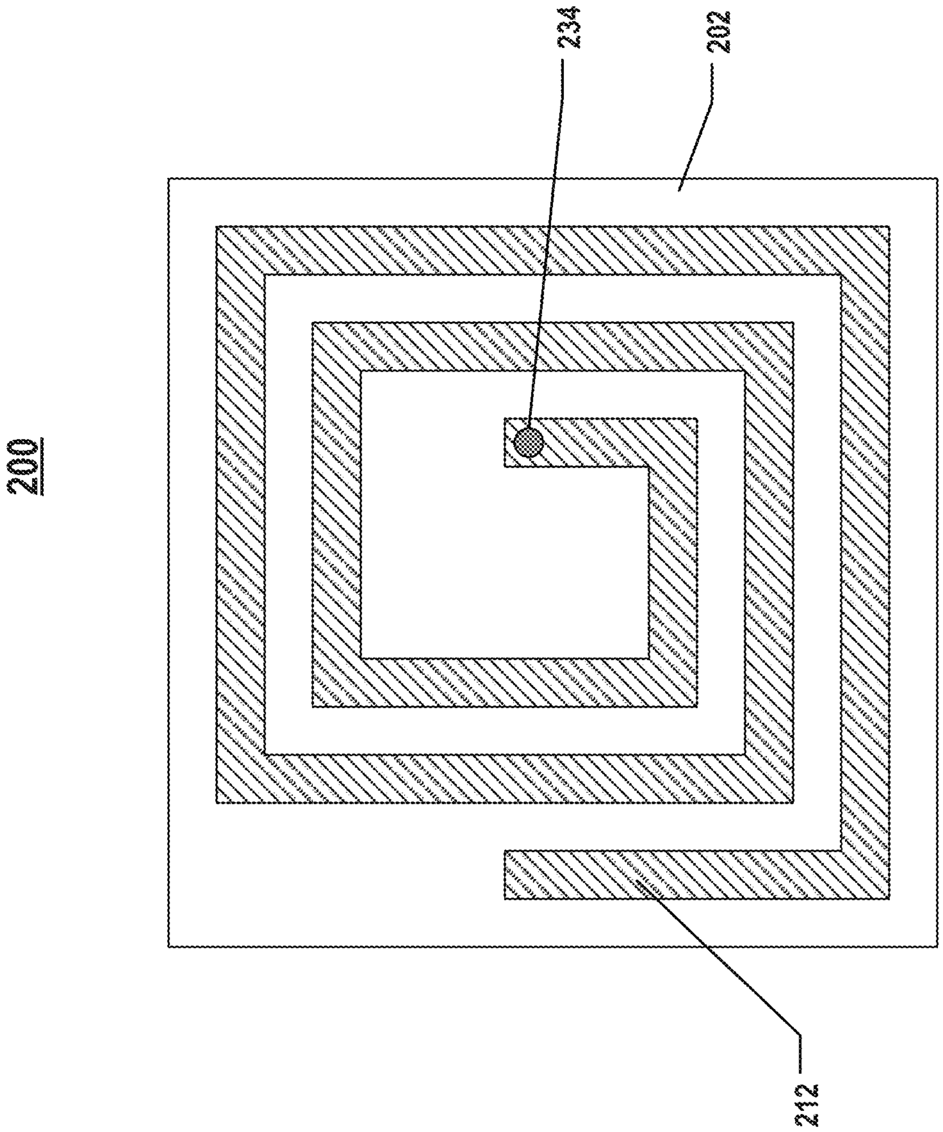
Figure 13:
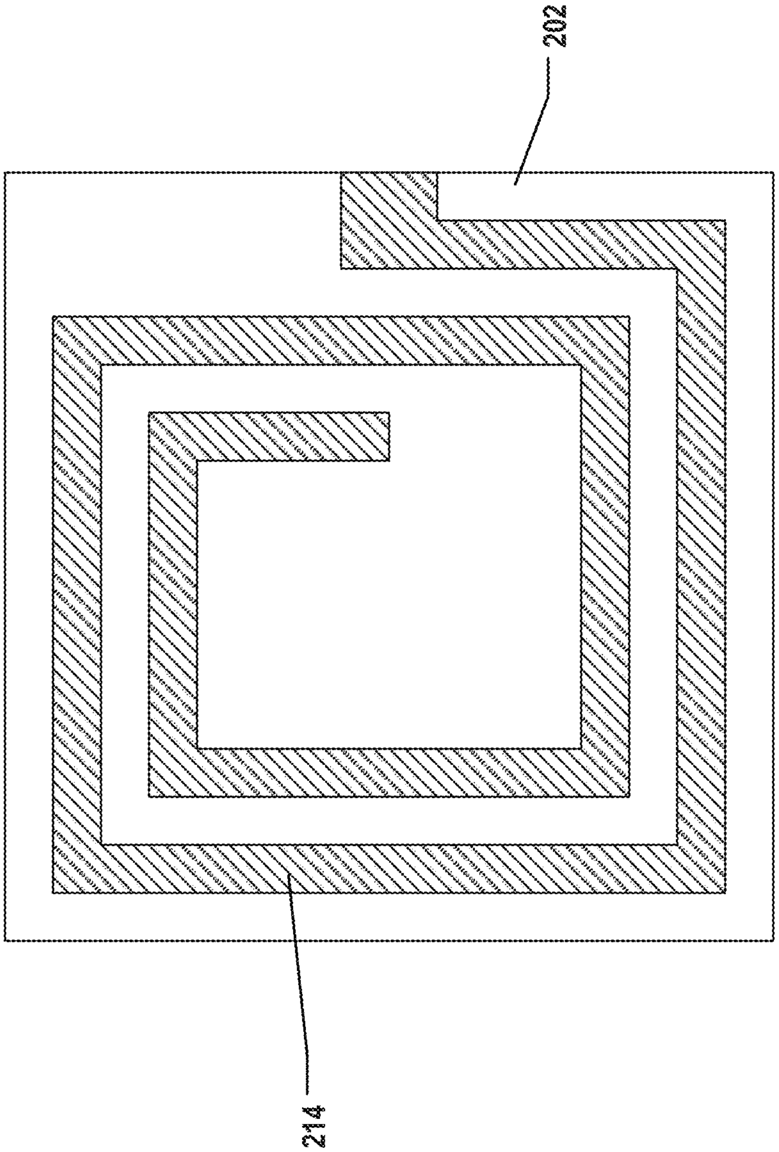

FIG. 7 illustrates a cross-section of an exemplary coil inductor 200, according to some aspects of the present disclosure. FIGS. 8-13 illustrate plan views of coil inductor 200, according to some aspects of the present disclosure. For the purpose of better describing the present disclosure, the cross-section and the plan view of coil inductor 200 in FIG. 7 and FIGS. 8-13 will be discussed together.

As shown in FIG. 7, coil inductor 200 may include a magnetic body 202, a plurality of conductive coils, and a plurality of insulation films disposed between two adjacent conductive coils. For example, a first conductive coil 204 and a second conductive coil 206 may be separated by a first insulation film 216, second conductive coil 206 and a third conductive coil 208 may be separated by a second insulation film 218, third conductive coil 208 and a fourth conductive coil 210 may be separated by a third insulation film 220, fourth conductive coil 210 and a fifth conductive coil 212 may be separated by a fourth insulation film 222, and fifth conductive coil 212 and a sixth conductive coil 214 may be separated by a fifth insulation film 224. In some implementations, coil inductor 200 may be similar to coil inductor 100, and the difference may be the position of the contacts, the amount of coil layers, and the coil design of the coils shown in FIGS. 8-13.

As shown in FIGS. 8-13, coil inductor 200 may include six layers of conductive coils, and each of first conductive coil 204, second conductive coil 206, third conductive coil 208, fourth conductive coil 210, fifth conductive coil 212, and sixth conductive coil 214 may include more than one coil loop. For example, each of first conductive coil 204, second conductive coil 206, third conductive coil 208, fourth conductive coil 210, fifth conductive coil 212, and sixth conductive coil 214 may include 2.5 coil loops.

In some implementations, a first contact 226 may electrically couple first conductive coil 204 with second conductive coil 206, a second contact 228 may electrically couple second conductive coil 206 with third conductive coil 208, a third contact 230 may electrically couple third conductive coil 208 with fourth conductive coil 210, a fourth contact 232 may electrically couple fourth conductive coil 210 with fifth conductive coil 212, and a fifth contact 234 may electrically couple fifth conductive coil 212 with sixth conductive coil 214. In some implementations, in the side vies of coil inductor 200, first contact 226, third contact 230, and fifth contact 234 may align with each other. In other words, in the plan view of coil inductor 200, first contact 226, third contact 230, and fifth contact 234 may overlap with each other. In some implementations, in the side vies of coil inductor 200, second contact 228 and fourth contact 232 may align with each other. In other words, in the plan view of coil inductor 200, second contact 228 and fourth contact 232 may overlap with each other.

Figure 14:
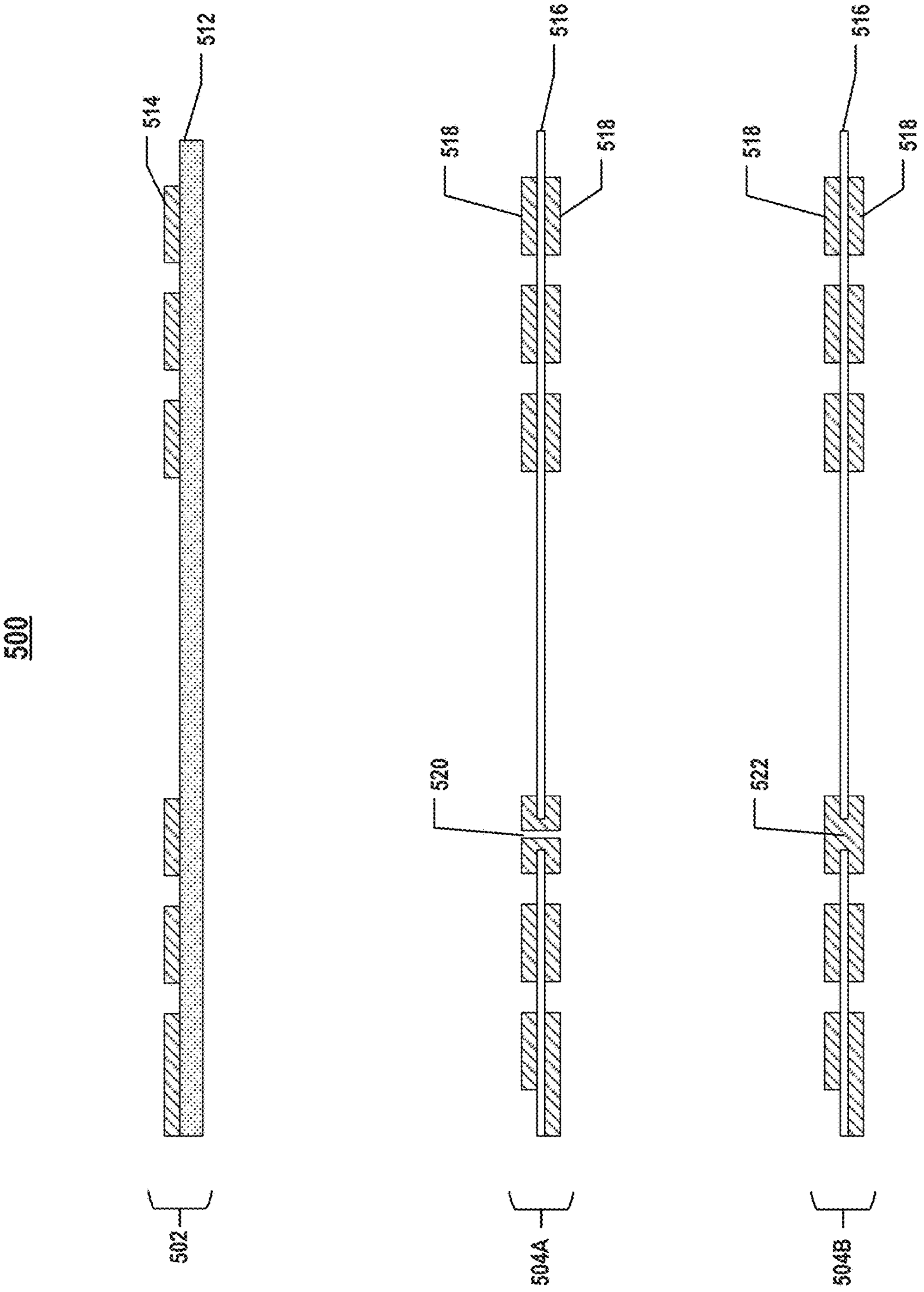
FIG. 14 illustrates cross-sections of conductive structures constructing an exemplary coil inductor, according to some aspects of the present disclosure.

FIG. 14 illustrates cross-sections of conductive structures 502, 504A, and 504B constructing an exemplary coil inductor, according to some aspects of the present disclosure. As shown in FIG. 14, conductive structure 502 includes a support 512 and a conductive film 514. In some implementations, support 512 may include a flexible film and conductive film 514 may include a copper film. In some implementations, support 512 may include a peelable material and may be peeled and separated from conductive film 514 in a later process as required. In some implementations, conductive film 514 may have a thickness between 5 micrometers and 120 micrometers. In some implementations, conductive film 514 may have a thickness between 5 micrometers and 100 micrometers. In some implementations, conductive film 514 may have a thickness between 5 micrometers and 50 micrometers. In some implementations, support 512 may have a thickness between 50 micrometers and 200 micrometers.

In some implementations, conductive film 514 may form a coil. In some implementations, in a plan view of conductive film 514, conductive film 514 may be a solenoid coil, a square shaped coil, a rectangle shaped coil, an oval shaped coil, a runway shaped coil, or other suitable shapes. In some implementations, conductive film 514 may include a half-circle coil. In some implementations, conductive film 514 may include a N-circle coil, and N is larger than 1.

As shown in FIG. 14, conductive structure 504A may include an insulation film 516 and two conductive films 518 disposed on both sides of insulation film 516. In some implementations, insulation film 516 may include a insulation material, such as polyimide (PI), polyethylene terephthalate (PET), or other suitable materials. In some implementations, insulation film 516 may have a thickness between 5 micrometers and 100 micrometers. In some implementations, insulation film 516 may have a thickness between 5 micrometers and 50 micrometers. In some implementations, insulation film 516 may have a thickness between 5 micrometers and 20 micrometers. Each of conductive films 518 may include a copper film. In some implementations, each of conductive films 518 may have a thickness between 5 micrometers and 120 micrometers. In some implementations, each of conductive films 518 may have a thickness between 5 micrometers and 100 micrometers. In some implementations, each of conductive films 518 may have a thickness between 5 micrometers and 50 micrometers.

As shown in FIG. 14, insulation film 516 may include a through hole, and a contact 520 may be formed in the through hole. Conductive films 518 disposed on both sides of insulation film 516 may be in electric contact with each other through contact 520. In some implementations, contact 520 may include the same material with conductive films 518. In some implementations, contact 520 may include copper. In some implementations, contact 520 may be a hollow structure having an opening in the center of contact 520, as shown in conductive structure 504A in FIG. 14. In some implementations, conductive films 518 disposed on both sides of insulation film 516 may be in electric contact with each other through a contact 522. In some implementations, contact 522 may include the same material with conductive films 518. In some implementations, contact 522 may include copper. In some implementations, contact 522 may be a solid structure without opening in the center, as shown in conductive structure 504B in FIG. 14.

Figure 15:
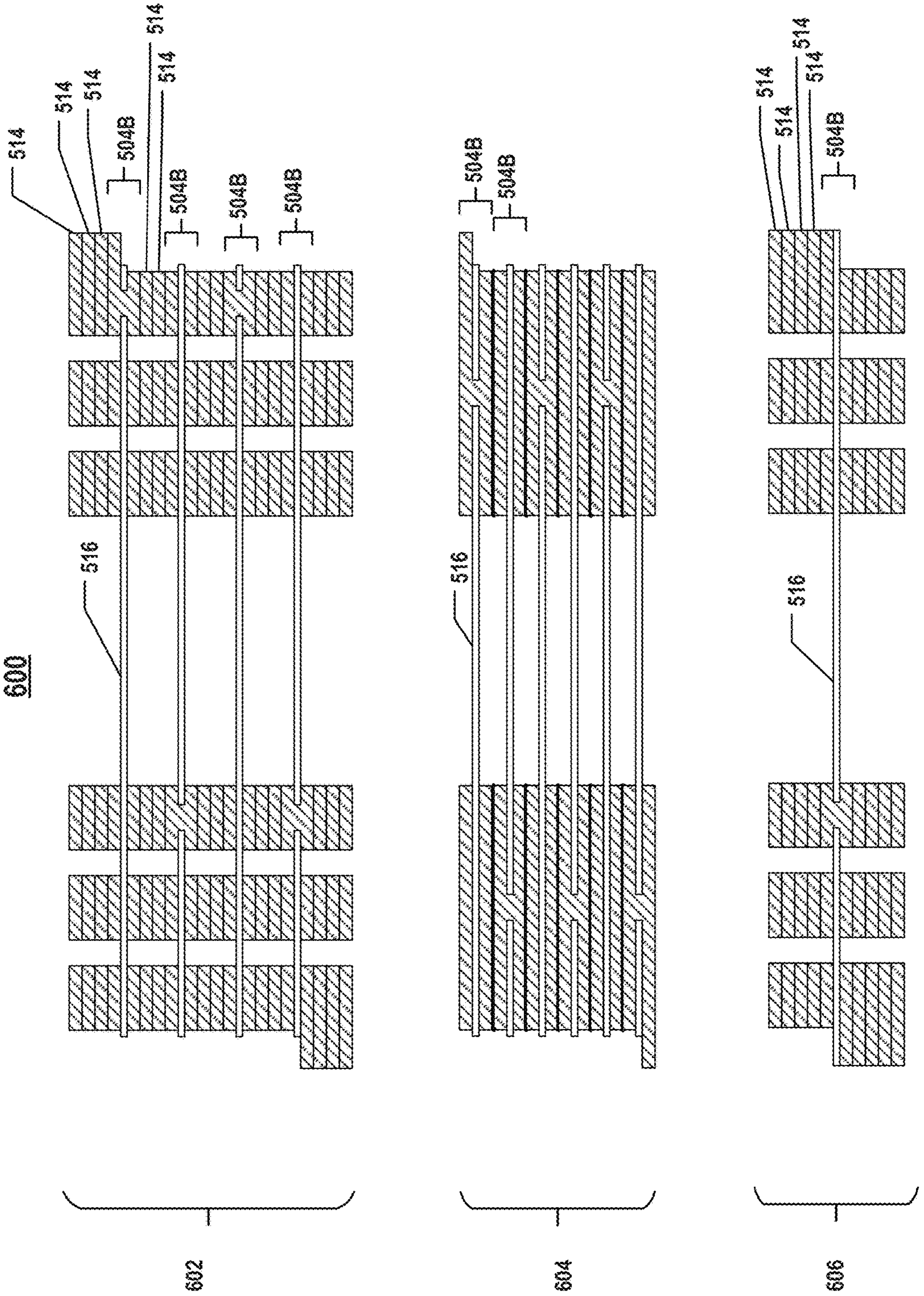
FIG. 15 illustrates a cross-section of an exemplary coil inductor, according to some aspects of the present disclosure.

FIG. 15 illustrates a cross-section of an exemplary coil inductor 600, according to some aspects of the present disclosure. Coil inductor 600 may be formed by any combination of conductive structure 502, conductive structure 504A, and/or conductive structure 504B. In some implementations, by combining different amount and structures of conductive structure 502, conductive structure 504A, and/or conductive structure 504B, coil inductor 600 may have different variants, such as coil inductor 602, coil inductor 604, or coil inductor 606, as shown in FIG. 15.

Coil inductor 602 may include a plurality of conductive structures 504B and a plurality of conductive structures 502 stacking together. Specifically, in some implementations, at least one conductive structure 502 may be disposed on conductive structure 504B, and then support 512 may be removed from conductive structure 502 and conductive film 514 is remained on conductive structure 504B. Conductive film 514 may further be stacked with other conductive structure 504B or other conductive film 514 to form coil inductor 602, as shown in FIG. 15. In some implementations, conductive film 514 and conductive structure 504B may be combined or attached by an adhesive layer. In some implementations, conductive film 514 and conductive structure 504B may be combined or attached by a conductive adhesive layer. In some implementations, conductive film 514 and conductive structure 504B may be combined or attached by a copper bonding operation.

Coil inductor 604 may include a plurality of conductive structures 504B. Specifically, in some implementations, at least two conductive structures 504B are stacked together to form coil inductor 604, as shown in FIG. 15. In some implementations, two conductive structures 504B may be combined or attached by an adhesive layer. In some implementations, two conductive structures 504B may be combined or attached by a conductive adhesive layer. In some implementations, two conductive structures 504B may be combined or attached by a copper bonding operation.

Coil inductor 606 may include at least one conductive structure 504B and a plurality of conductive films 514 attached on both sides of conductive structure 504B. As shown in FIG. 15, conductive structure 504B includes two conductive films 518 on both sides of insulation film 516, and conductive films 514 may be attached on two conductive films 518. In some implementations, conductive film 514 and conductive structure 504B may be combined or attached by an adhesive layer. In some implementations, conductive film 514 and conductive structure 504B may be combined or attached by a conductive adhesive layer. In some implementations, conductive film 514 and conductive structure 504B may be combined or attached by a copper bonding operation.

Figure 16A:
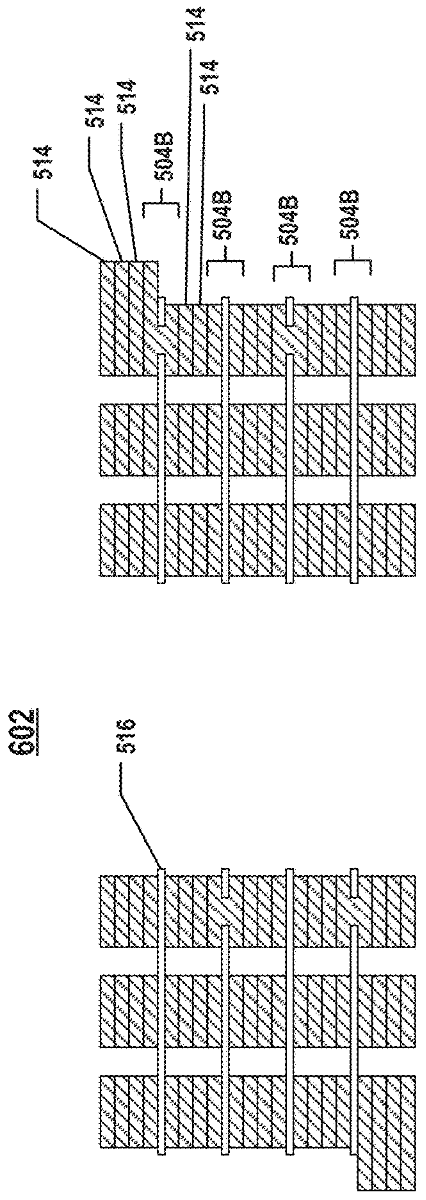
FIGS. 16A-16B illustrate cross-sections of an exemplary coil inductor, according to some aspects of the present disclosure.
Figure 16B:
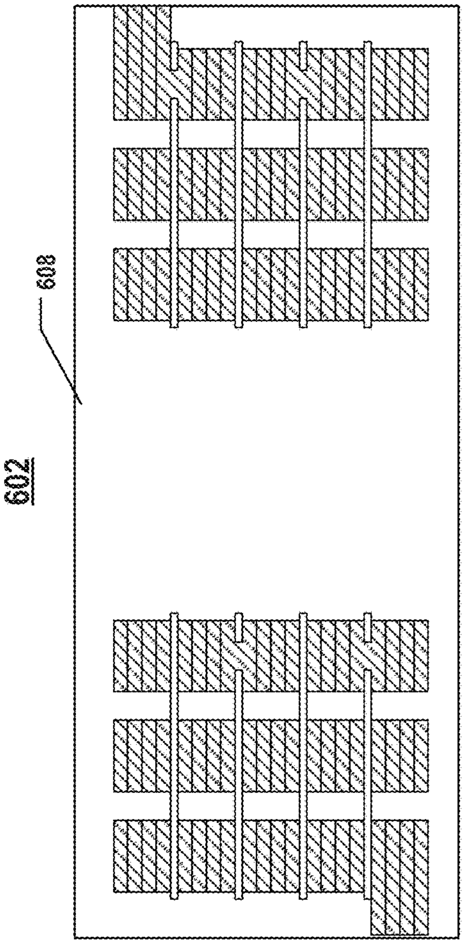

FIGS. 29A-29B illustrate cross-sections of coil inductor 602, according to some aspects of the present disclosure. After stacking conductive film 514 with conductive structure 504B, a cutting operation may be further performed to cut portions of insulation film 516. In some implementations, in a plan view of coil inductor 602, insulation film 516 at the center portion of coil inductor 602 may be removed, as shown in FIG. 16A. Then as shown in FIG. 16B, a magnetic body 608 may be formed to cover conductive coil 602.

In some implementations, a magnetic alloy mixture may be provided to fully cover coil inductor 602. In some implementations, the plurality of conductive structure 504B, the plurality of conductive films 514, and the insulation film 516 are embedded in the magnetic alloy mixture. In some implementations, the magnetic alloy mixture may include magnetic alloy powders and binders. In some implementations, the magnetic alloy mixture may be powder or paste. In some implementations, the magnetic alloy mixture may include a ferrite material containing the respective components of Fe, Ni, Zn and/or Cu as main components. In some implementations, the magnetic alloy mixture may include a ferrite material containing Ni—Cu—Zn based ferrite material, Ni—Cu—Zn—Mg based ferrite material, and/or Ni—Cu based ferrite material. In some implementations, the magnetic alloy mixture may include a ferrite sintered body.

Then, in some implementations, a compression operation may be performed on the magnetic alloy mixture through a soft medium to compress the magnetic alloy mixture to magnetic body 608. In some implementations, the soft medium may surround the magnetic alloy mixture to compress the magnetic alloy mixture to magnetic body 608. In some implementations, the soft medium may be liquid medium. In some implementations, the liquid medium may include water.

In some implementations, a planarization operation may further be performed on surfaces of magnetic body 608. After the compression operation using the soft medium, the surface of magnetic body 608 may be uneven, and the planarization operation may improve the roughness of the surface of magnetic body 608. In some implementations, the planarization operation may include a grinder process. In some implementations, the magnetic body 608 may be baked or cured to further solidify the magnetic body 608.

Figure 17:
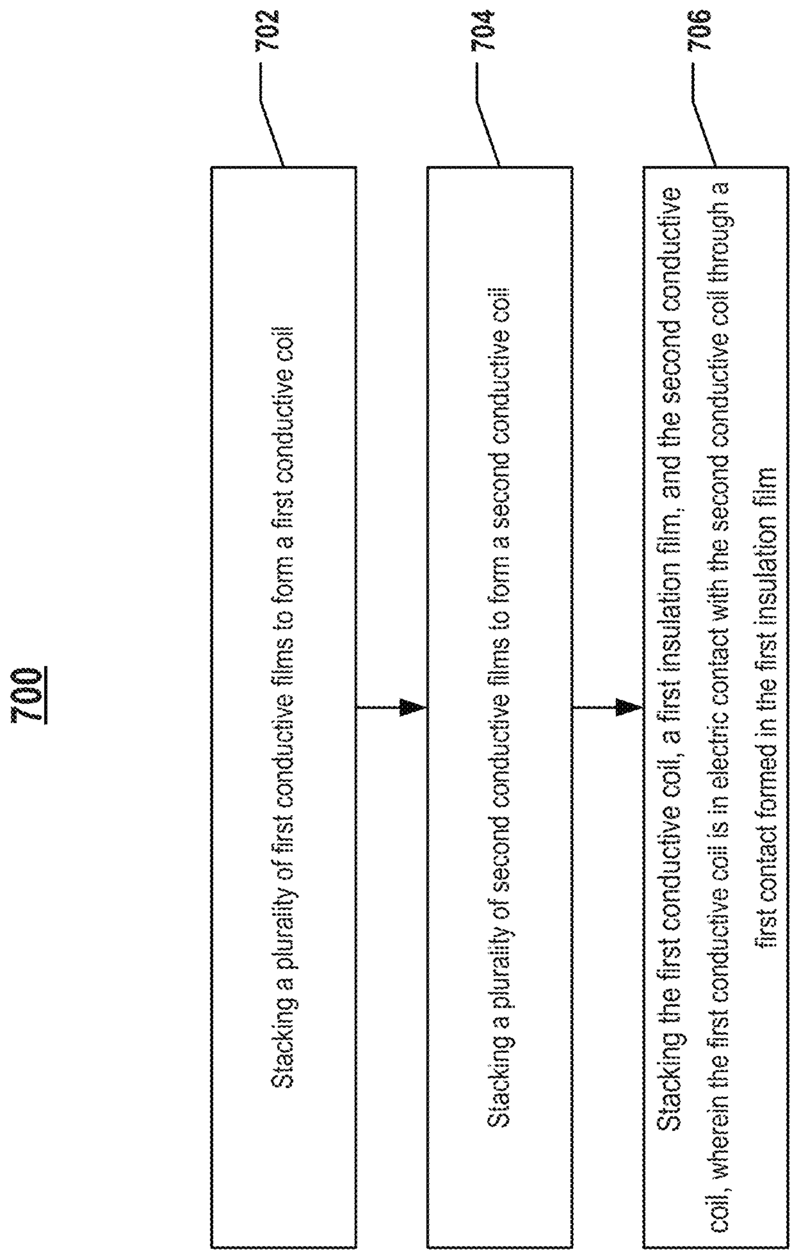
FIG. 17 illustrates a flowchart of an exemplary method for forming a coil inductor, according to some aspects of the present disclosure.

FIG. 17 illustrates a flowchart of an exemplary method 700 for forming coil inductor 606, according to some aspects of the present disclosure. In operation 702 of FIG. 17, a plurality of conductive films 514 are stacked to form a first conductive coil. In operation 704 of FIG. 17, a plurality of conductive films 514 are stacked to form a second conductive coil. In operation 706 of FIG. 17, the first conductive coil and the second conductive coil are attached to both side of conductive structure 504B. The first conductive coil is in electric contact with the second conductive coil through contact 522 formed in insulation film 516 of conductive structure 504B.

It is understood that the operations shown in method 700 are not exhaustive and that other operations may be performed as well before, after, or between any of the illustrated operations. Further, some of the operations may be performed simultaneously, or in a different order than shown in FIG. 17. For example, the first conductive coil and the second conductive coil may be formed simultaneously and be attached onto conductive structure 504B simultaneously. For another example, multiple conductive films 514 may be attached to conductive structure 504B layer by layer. In other words, operation 702 or operation 704 may be performed several times to form a conductive coil having a required thickness.

In some implementations, more conductive films 514 may be stacked to form a third conductive coil, and the first conductive coil, conductive structure 504B, the second conductive coil, another conductive structure 504B, and the third conductive coil may further be stacked together to form additional layers of the conductive coils.

In some implementations, after stacking the first conductive coil, conductive structure 504B, and the second conductive coil, a cutting operation may be performed to remove portions of insulation film 516. Then, a magnetic body may be formed to cover the first conductive coil, conductive structure 504B, and the second conductive coil.

By flexibly combining conductive structure 502, conductive structure 504A, and conductive structure 504B, the conductive coils may be formed with any required thickness by stacking conductive structure 502, conductive structure 504A, and/or conductive structure 504B. The conductive coils separated by the insulation films may be in electric contact with each other through the contacts formed in the insulation films. Hence, the coil inductor may be manufactured in a flexible way to fulfill various design requirements.

Figure 18:
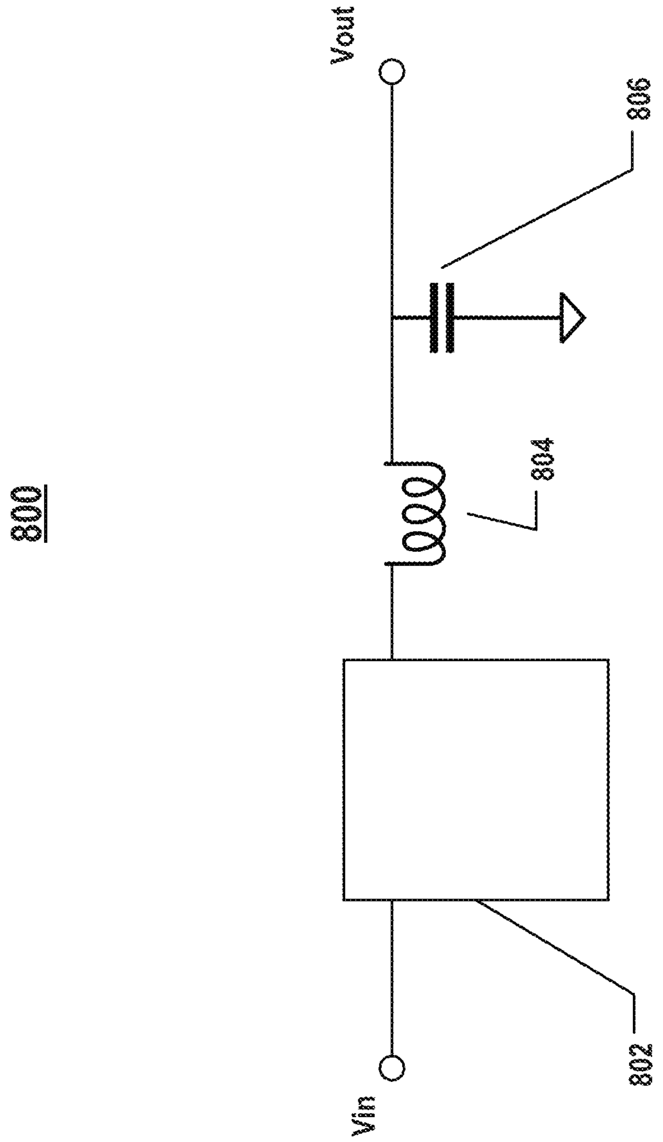
FIG. 18 illustrates a block diagram of an exemplary power converting system having a coil inductor, according to some aspects of the present disclosure.

FIG. 18 illustrates a block diagram of an exemplary power converting system 800 having a coil inductor, according to some aspects of the present disclosure. In some implementations, power converting system 800 is a DC-DC converter. In some implementations, power converting system 800 may be applied to various power supply circuits. For example, the processor, memory, LEDs, and other devices require many different DC voltages to run, and power converting system 800 may adjust these differences in voltages. Hence, power converting system 800 are required in most electronic devices, and typically, a large number of them are used in a device.

Power converting system 800 may include a controller 802, a coil inductor 804, and a capacitor 806. Coil inductor 804 may be configured to convert a source voltage Vin to a required voltage Vout. Controller 802 may be coupled to coil inductor 804 and may be configured to control operations of coil inductor 804. Coil inductor 804 may work with capacitor 806 to play the role of rectifying the rectangular wave output from control 802 to a direct current.

According to one aspect of the present disclosure, a coil inductor is disclosed. The coil inductor includes a first conductive coil, a second conductive coil, a third conductive coil, a first insulation film, and a second insulation film. The first insulation film is disposed on the first conductive coil, and the first insulation film includes at least one first through hole. The second conductive coil is disposed on the first insulation film. The second insulation film is disposed on the second conductive coil, and the second insulation film includes at least one second through hole unaligned with the first through hole. The third conductive coil is disposed on the second insulation film. The first conductive coil is in electric contact with the second conductive coil through a first contact disposed in the first through hole, and the second conductive coil is in electric contact with the third conductive coil through a second contact disposed in the second through hole. A first thickness of the first conductive coil, the second conductive coil, and the third conductive coil is between 20 micrometers and 100 micrometers. A second thickness of the first insulation film and the second insulation film is between 5 micrometers and 50 micrometers.

In some implementations, the coil inductor further includes a magnetic body covering the first conductive coil, the second conductive coil, the third conductive coil, the first insulation film, and the second insulation film. In some implementations, the first insulation film and the second insulation film further comprise a polyimide film.

In some implementations, the first conductive coil, the second conductive coil, and the third conductive coil further comprise a copper film. In some implementations, the magnetic body is formed by a mixture of a magnetic alloy powder and a binder.

According to another aspect of the present disclosure, a coil inductor is disclosed. The coil inductor includes a first conductive coil, a first insulation film disposed on the first conductive coil, and a second conductive coil disposed on the first insulation film. The first conductive coil includes a plurality of first conductive films stacking along a first direction. The first insulation film extends along a second direction perpendicular to the first direction and includes at least one through hole. The second conductive coil includes a plurality of second conductive films stacking along the first direction. The first conductive coil is in electric contact with the second conductive coil through a first contact disposed in the through hole.

In some implementations, the plurality of first conductive films and the plurality of second conductive films are respectively combined by an adhesive layer. In some implementations, the plurality of first conductive films and the plurality of second conductive films are respectively combined by a copper bonding operation.

In some implementations, each of the plurality of first conductive films has a thickness between 5 micrometers and 120 micrometers, and each of the plurality of second conductive films has a thickness between 5 micrometers and 120 micrometers.

In some implementations, the first contact comprises a hollow structure. In some implementations, the first contact comprises a solid structure. In some implementations, the first insulation film has a thickness between 5 micrometers and 20 micrometers.

In some implementations, the coil inductor further includes a second insulation film disposed on the second conductive coil, and a third conductive coil disposed on the second insulation film. The third conductive coil includes a plurality of third conductive films stacking along the first direction. The second conductive coil is in electric contact with the third conductive coil through a second contact formed in the second insulation film.

According to still another aspect of the present disclosure, a coil inductor is disclosed. The coil inductor includes a first conductive film disposed above a first insulation film, a second conductive film disposed beneath the first insulation film, a third conductive film disposed above a second insulation film, and a fourth conductive film disposed beneath the second insulation film. The first conductive film and the second conductive film are in electric contact through a first contact formed in the first insulation film. The third conductive film and the fourth conductive film are in electric contact through a second contact formed in the second insulation film. The second conductive film is attached to the third conductive film.

In some implementations, the first conductive film, the first insulation film, the second conductive film, the third insulation film, the second insulation film, and the fourth conductive film are sequentially stacked along a first direction. In some implementations, the second conductive film is in electrical contact with the third conductive film.

In some implementations, the second conductive film is attached to the third conductive film by a conductive adhesive layer. In some implementations, the second conductive film is attached to the third conductive film by a copper bonding operation.

In some implementations, each of the first conductive film, the second conductive film, the third conductive film, and the fourth conductive film has a thickness between 5 micrometers and 120 micrometers. In some implementations, each of the first contact and the second contact comprises a hollow structure. In some implementations, each of the first contact and the second contact comprises a solid structure.

In some implementations, each of the first insulation film and the second insulation film has a thickness between 5 micrometers and 20 micrometers. In some implementations, the coil inductor further includes at least one fifth conductive film disposed between the second conductive film and the third conductive film.

According to yet another aspect of the present disclosure, a power converting system is disclosed. The power converting system includes a coil inductor configured to convert a source voltage to a required voltage, and a controller coupled to the coil inductor. The coil inductor includes a first conductive coil, a second conductive coil, a third conductive coil, a first insulation film, and a second insulation film. The first insulation film is disposed on the first conductive coil, and the first insulation film includes at least one first through hole. The second conductive coil is disposed on the first insulation film. The second insulation film is disposed on the second conductive coil, and the second insulation film includes at least one second through hole unaligned with the first through hole. The third conductive coil is disposed on the second insulation film. The first conductive coil is in electric contact with the second conductive coil through a first contact disposed in the first through hole, and the second conductive coil is in electric contact with the third conductive coil through a second contact disposed in the second through hole. A first thickness of the first conductive coil, the second conductive coil, and the third conductive coil is between 20 micrometers and 100 micrometers. A second thickness of the first insulation film and the second insulation film is between 5 micrometers and 50 micrometers. The controller is coupled to the coil inductor and is configured to control operations of the coil inductor.

According to yet another aspect of the present disclosure, a power converting system is disclosed. The power converting system includes a coil inductor configured to convert a source voltage to a required voltage, and a controller coupled to the coil inductor. The coil inductor includes a first conductive coil, a first insulation film disposed on the first conductive coil, and a second conductive coil disposed on the first insulation film. The first conductive coil includes a plurality of first conductive films stacking along a first direction. The first insulation film extends along a second direction perpendicular to the first direction and includes at least one through hole. The second conductive coil includes a plurality of second conductive films stacking along the first direction. The first conductive coil is in electric contact with the second conductive coil through a first contact disposed in the through hole.

According to yet another aspect of the present disclosure, a power converting system is disclosed. The power converting system includes a coil inductor configured to convert a source voltage to a required voltage, and a controller coupled to the coil inductor. The coil inductor includes a first conductive film disposed above a first insulation film, a second conductive film disposed beneath the first insulation film, a third conductive film disposed above a second insulation film, and a fourth conductive film disposed beneath the second insulation film. The first conductive film and the second conductive film are in electric contact through a first contact formed in the first insulation film. The third conductive film and the fourth conductive film are in electric contact through a second contact formed in the second insulation film. The second conductive film is attached to the third conductive film.

According to yet another aspect of the present disclosure, a manufacturing method for forming a coil inductor is disclosed. A plurality of first conductive films are stacked to form a first conductive coil. A plurality of second conductive films are stacked to form a second conductive coil. The first conductive coil, a first insulation film, and the second conductive coil are stacked together. The first conductive coil is in electric contact with the second conductive coil through a first contact formed in the first insulation film.

In some implementations, a plurality of third conductive films are stacked to form a third conductive coil, and the first conductive coil, the first insulation film, the second conductive coil, a second insulation film, and the third conductive coil are stacked. The second conductive coil is in electric contact with the third conductive coil through a second contact formed in the second insulation film.

In some implementations, the first insulation film is cut. In some implementations, a magnetic body is formed covering the first conductive coil, the first insulation film, and the second conductive coil.

The foregoing description of the specific implementations can be readily modified and/or adapted for various applications. Therefore, such adaptations and modifications are intended to be within the meaning and range of equivalents of the disclosed implementations, based on the teaching and guidance presented herein.

The breadth and scope of the present disclosure should not be limited by any of the above-described exemplary implementations, but should be defined only in accordance with the following claims and their equivalents.

What is claimed is:

1. A coil inductor, comprising:

a first conductive coil;

a first insulation film disposed on the first conductive coil, the first insulation film comprising at least one first through hole;

a second conductive coil disposed on the first insulation film;

a second insulation film disposed on the second conductive coil, the second insulation film comprising at least one second through hole unaligned with the first through hole;

a third conductive coil disposed on the second insulation film, wherein the first conductive coil is in electric contact with the second conductive coil through a first contact disposed in the first through hole, and the second conductive coil is in electric contact with the third conductive coil through a second contact disposed in the second through hole;

a first thickness of the first conductive coil, the second conductive coil, and the third conductive coil is between 20 micrometers and 100 micrometers;

a second thickness of the first insulation film and the second insulation film is between 5 micrometers and 50 micrometers; and the first contact comprises a hollow structure.

2. The coil inductor of claim 1, further comprising:

a magnetic body covering the first conductive coil, the second conductive coil, the third conductive coil, the first insulation film, and the second insulation film.

3. The coil inductor of claim 2, wherein the magnetic body is formed by a mixture of a magnetic alloy powder and a binder.

4. The coil inductor of claim 1, wherein the first insulation film and the second insulation film further comprise a polyimide film.

5. The coil inductor of claim 1, wherein the first conductive coil, the second conductive coil, and the third conductive coil further comprise a copper film.

6. A coil inductor, comprising:

a first conductive coil, comprising:

a plurality of first conductive films stacking along a first direction;

a first insulation film disposed on the first conductive coil, the first insulation film extending along a second direction perpendicular to the first direction and comprising at least one through hole;

a second conductive coil disposed on the first insulation film, the second conductive coil comprising:

a plurality of second conductive films stacking along the first direction, wherein the first conductive coil is in electric contact with the second conductive coil through a first contact disposed in the through hole; and wherein the plurality of first conductive films and the plurality of second conductive films are respectively combined by an adhesive layer.

7. The coil inductor of claim 6, wherein the plurality of first conductive films and the plurality of second conductive films are respectively combined by a copper bonding operation.

8. The coil inductor of claim 6, wherein each of the plurality of first conductive films has a thickness between 5 micrometers and 120 micrometers, and each of the plurality of second conductive films has a thickness between 5 micrometers and 120 micrometers.

9. The coil inductor of claim 6, wherein the first contact comprises a hollow structure.

10. The coil inductor of claim 6, wherein the first contact comprises a solid structure.

11. The coil inductor of claim 6, wherein the first insulation film has a thickness between 5 micrometers and 20 micrometers.

12. The coil inductor of claim 6, further comprising:

a second insulation film disposed on the second conductive coil; and a third conductive coil disposed on the second insulation film, the third conductive coil comprising:

a plurality of third conductive films stacking along the first direction, wherein the second conductive coil is in electric contact with the third conductive coil through a second contact formed in the second insulation film.

13. A coil inductor, comprising:

a first conductive film disposed above a first insulation film;

a second conductive film disposed beneath the first insulation film;

a third conductive film disposed above a second insulation film; and a fourth conductive film disposed beneath the second insulation film, wherein the first conductive film and the second conductive film are in electric contact through a first contact formed in the first insulation film; the third conductive film and the fourth conductive film are in electric contact through a second contact formed in the second insulation film; and the second conductive film is attached to the third conductive film.

14. The coil inductor of claim 13, wherein the first conductive film, the first insulation film, the second conductive film, the third insulation film, the second insulation film, and the fourth conductive film are sequentially stacked along a first direction.

15. The coil inductor of claim 13, wherein the second conductive film is in electrical contact with the third conductive film.

16. The coil inductor of claim 15, wherein the second conductive film is attached to the third conductive film by a conductive adhesive layer.

17. The coil inductor of claim 15, wherein the second conductive film is attached to the third conductive film by a copper bonding operation.

18. The coil inductor of claim 13, wherein each of the first conductive film, the second conductive film, the third conductive film, and the fourth conductive film has a thickness between 5 micrometers and 120 micrometers.

19. The coil inductor of claim 13, wherein each of the first contact and the second contact comprises a hollow structure or a sloid structure.

* * * * *